Nov. 4, 1941.                  C. T. HOFFMAN                      2,261,723
                                INTERVAL TIMER
                              Filed July 3, 1940
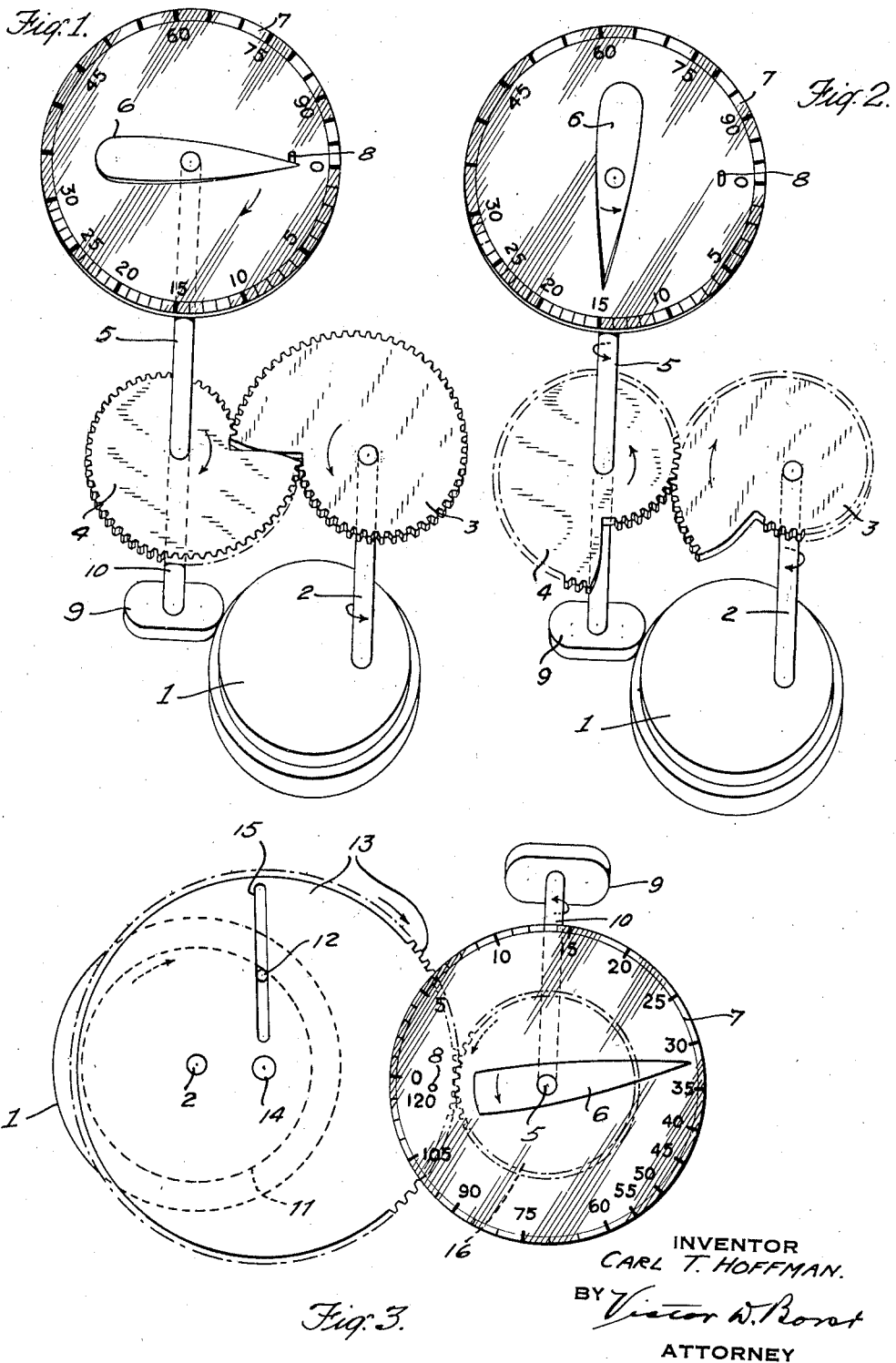
INVENTOR
CARL T. HOFFMAN.
BY
ATTORNEY Patented Nov. 4, 1941

2,261,723

UNITED STATES PATENT OFFICE 2,261,723

INTERVAL TIMER

Carl T. Hoffman, Watertown, Conn.

Application July 3, 1940, Serial No. 343,724

2 Claims. (Cl. 161—23)

This invention relates to interval timers and more particularly to an interval timer having a variable graduated time scale.

The principal object of the invention is to provide an interval timer adapted to accurately indicate short intervals of time as well as adapted to indicate intervals of time over a wide range.

Another object of the invention is to provide an interval timer whose reference scale graduations are spaced relatively far apart at one end of the scale and relatively close together at the other end of the scale.

Another object of the invention is to provide an interval timer with a single scale whose full range is over a relatively long period of time, but whose graduations representing short periods of time are spread out over a relatively large part of the scale.

Other objects will be apparent from a consideration of the specification and drawing forming a part of this application in which:

Fig. 1 is a diagrammatic representation of an embodiment of my invention as it is being set to time an interval;

Fig. 2 is similar to Fig. 1, but showing the timer in a measuring condition; and Fig. 3 is a diagrammatic representation of a modification of the invention shown in Figs. 1 and 2.

Heretofore, interval timers with single scales have been designed to be accurate either over short periods of time or over long periods of time. If intervals of a fraction of an hour were to be timed, the scale was graduated up to an hour and longer intervals could not be timed by the instrument without separately observing the number of complete revolutions of the pointer or without adding a separate mechanism to record the complete revolutions. The former system lead to confusion and the latter system required a more complicated structure and the reading of two dials. Some single scale interval timers are calibrated to, for example, one hundred and twenty minutes. The scales of these instruments are closely graduated, three degrees indicating one minute of time, and have been satisfactory only for the timing of long intervals. However, these instruments could not be used with accuracy for timing short intervals and it has been necessary when long intervals and short intervals are desired to be timed accurately, to provide either two timers, each operable over its individual range, or sacrifice accuracy in timing the shorter intervals when using a single scale wide range timer.

The present invention overcomes these difficulties by providing a variable speed drive between the constant speed driver and the pointer, which causes the pointer to move over the scale at constantly varying velocities. That the scale graduations may indicate equal intervals of time, the marks on the scale are spaced apart directly as the velocity of the pointer as it passes over the individual spaces. A signal effecting device indicates the termination of the timed interval.

The constant speed driver may be the conventional spring-driven escapement type such as one in which the main driving spring is connected to the output shaft and the frame or housing of the driver and in which the first gear of the escapement mechanism is mounted on the output shaft by a friction clutch stiff enough to hold back the force of the main spring so that the output shaft can rotate only as fast as the escapement mechanism will allow it to rotate and weak enough to permit the output shaft to be turned by hand to wind up the spring and set the timer without putting sufficient strain on the escapement gears to damage this part of the mechanism. The device may also include mechanical stops to arrest the motion of the output shaft when it reaches a definite position. The details of the constant speed driver are not shown as drivers of this type are now in general commercial use with interval timers and the details of the driver do not form a part of the present invention.

The termination of the timed interval may be indicated by a conventional bell and hammer mechanism, such as one in which an aural signal is made upon movement of the hammer against the bell. Or a conventional cam and follower may be used in which the follower moves a rod connected to a switch controlling electrical appliances or a rod connected to another device such as a valve for controlling the flow of fluids, such as gas supplied to an oven or a stove. The details of these devices are not shown as such mechanisms are now in general commercial use with interval timers and other devices and the details of such mechanisms do not form a part of the present invention. For the purposes of this specification and the appended claims, the phrase "effecting a signal" includes producing aural or mechanical signals as defined generally herein.

Referring particularly to Figs. 1 and 2, I represents a conventional constant speed driver such as is commonly used in interval timers and referred to herein. The output shaft 2 of driver I is connected to spiral shaped gear 3. In mesh with gear 3 is a second spiral shaped gear 4 whose toothed edge is complementary in shape to that of gear 3 and whose center is so positioned from the center of gear 3 that the two gears will mesh with each other continuously. The rotation of shaft 2 causes shaft 5, secured to gear 4, to rotate at varying speeds according to the particular portions of gears 3 and 4 that are in mesh with each other at any given instant.

Shaft 5 is connected to a pointer 6, which is mounted to move over disk scale 7 whose marks form spaces of unequal length and in proportion to the velocity of the pointer 6 as it sweeps over them. A stop 8, secured to disk 7 or to any solid support on the frame of the mechanism, cooperates with pointer 6 to arrest the motion of pointer 6 when it has reached a position opposite the zero mark on disk 7. It will be apparent that stop 8 may be located within constant speed driver or at any other convenient point on shafts 5 or 2.

In Fig. 1, the arrows show the directions of movement of the various parts of the instrument while setting it to measure an interval of time. Pointer 6 is moved clockwise, turning gear 4 clockwise and gear 3 counterclockwise. Shaft 2 is turned counterclockwise against the force of the main spring in driver 1.

When the pointer 6 has been turned to a position over the scale corresponding to the interval of time desired to be measured, pointer 6 is released.

In Fig. 2, the arrows show the directions of movement of the various parts of the instrument while timing an interval. Driver 1 turns shaft 2 clockwise driving gear 3 at a constant speed. Gear 4 is driven counterclockwise at varying velocities, driving pointer 6 counterclockwise at varying velocities, but passing over the spaces between the marks on scale 7 in equal intervals of time. The instrument is stopped when pointer 6 meets stop 8.

9 represents the conventional signal effecting device used commercially in interval timers and other devices. It is shown as being connected to shaft 5, by shaft 10, but it is apparent that it may be connected to shaft 2. It is of course essential that it be adjusted to effect a signal when pointer 6 is opposite the zero mark of scale 7.

Fig. 3 shows a modification of the instrument as disclosed in Figs. 1 and 2 and in which like reference characters represent like parts. Driver 1 rotates shaft 2 on the upper end of which is secured a disk 11 near the periphery of which is mounted a pin 12. Above disk 11 is mounted a toothed gear 13 which is free to rotate about a shaft 14 secured to the center of the gear. In gear 13 is cut a radial slot 15, which is adapted to engage pin 12. The pointer shaft 5 is connected to a toothed disk 16 which is mounted to mesh with gear 13. The ratio of these gears is shown as two-to-one, that one-half revolution of the driver will cause the pointer to rotate one complete revolution.

In operation, driver 1 turns shaft 2 and with it disk 11 at a constant speed. As pin 12, on disk 11, turns as indicated by the arrow, gear 13 is turned about its supporting shaft 14 at variable rates according to the relative position of pin 12 to shaft 14. The velocity of gear 13 is greatest when pin 12 is on a horizontal line with and closest to shaft 14 and is slowest when pin 12 is on a horizontal line with and farthest away from shaft 14. Pointer 6 is connected to gear 16 which meshes with gear 13.

As the velocity of gear 13 passes through a complete cycle of a minimum to a maximum and then to a minimum for each revolution of shaft 2 and as it is desired that the velocity of pointer 6 be from a minimum velocity to a maximum velocity for one revolution of shaft 5, the ratio between the diameters of disks 13 and gear 16 is made that of two-to-one.

As an example of the application of the principles of operation of the instrument to a particular case, and assuming that the range of time intervals desired to be determined is from zero to two hours, the rotation of shaft 2 is adjusted by the escape mechanism so that it turns one revolution in four hours. Gear 13 will then pass through one complete cycle of varying velocity during this time or through one half cycle in one hundred and twenty minutes. The scale 7 is divided into spaces by marks such that the pointer 6 will sweep over the spaces between adjacent marks in equal intervals of time. The spacing of these marks will be dependent upon relative diameters of disk 11 and gear 13 and the relative positions of their supporting shafts 2 and 14 respectively.

The termination of the interval is indicated by the conventional signal effecting device 9 connected by shaft 10 to shaft 5, as previously described.

It is obvious that various changes may be made by those skilled in the art in the details of the embodiment of the invention disclosed in the drawing and described above within the principle and scope of the invention as expressed in the appended claims. As an example: The invention has been disclosed and described as including an escapement type of spring-driven constant speed driver. It is obvious that other types of constant speed drivers could be used, such as a synchronous type connected to the mechanism by a conventional slippage clutch and connected to a suitable source of power.

I claim:

1. An interval timer comprising a constant speed driver of the energy storing type, an output shaft for the driver connected to introduce energy therein when rotated in one direction, a pointer shaft, a scale with variably spaced marks, a pointer on the pointer shaft adapted to move over the scale, a spiral shaped gear on the output shaft, and a similar gear in mesh therewith on the pointer shaft, whereby movement of the pointer in one direction stores energy in the driver at a constantly varying ratio to the movement of the pointer and the stored energy drives the pointer in the opposite direction at a reversely variable rate.

2. An interval timer comprising a constant speed driver of the energy storing type, an output shaft for the driver connected to introduce energy therein when rotated in one direction, a pointer shaft, a scale with variably spaced marks, a pointer on the pointer shaft adapted to move over the scale, a spiral shaped gear on the output shaft, a similar gear in mesh therewith on the pointer shaft, whereby movement of the pointer in one direction stores energy in the driver at a constantly varying ratio to the movement of the pointer and the stored energy drives the pointer in the opposite direction at a reversely variable rate, and means connected to the pointer for effecting a signal when the pointer reaches the zero mark on the scale.

CARL T. HOFFMAN.